United States Patent
Wu et al.

(10) Patent No.: US 9,817,148 B2
(45) Date of Patent: Nov. 14, 2017

(54) BOREHOLE WHILE DRILLING ELECTROMAGNETIC TOMOGRAPHY ADVANCED DETECTION APPARATUS AND METHOD

(71) Applicant: WUHAN CHANGSHENG MINE SECURITY TECHNOLOGY LIMITED, Hubei (CN)

(72) Inventors: Qiang Wu, Hubei (CN); Liu Liu, Hubei (CN); Hengyuan Li, Hubei (CN); Yifan Zeng, Hubei (CN); Fengjuan Tao, Hubei (CN); Shuiqing Xie, Hubei (CN); Chunsheng Liu, Hubei (CN)

(73) Assignee: WUHAN CHANGSHENG MINE SECURITY TECHNOLOGY LIMITED, Hubei (CN)

( * ) Notice: Subject to any disclaimer, the term of this patent is extended or adjusted under 35 U.S.C. 154(b) by 30 days.

(21) Appl. No.: 15/004,415

(22) Filed: Jan. 22, 2016

(65) Prior Publication Data
US 2016/0223703 A1    Aug. 4, 2016

(30) Foreign Application Priority Data

Jan. 29, 2015    (CN) .......................... 2015 1 0043420

(51) Int. Cl.
*G01V 3/30* (2006.01)
*G01R 33/00* (2006.01)

(52) U.S. Cl.
CPC ...................................... *G01V 3/30* (2013.01)

(58) Field of Classification Search
CPC ........ G01R 33/032; G01R 33/34; G01V 3/26; G01V 3/28; G01V 3/30; G01N 24/081; H04L 1/0009
USPC ....... 324/314, 323, 324–368, 221, 637, 639, 324/676, 76.11–76.77, 250, 710, 500, 324/754.06, 754.31
See application file for complete search history.

(56) References Cited

U.S. PATENT DOCUMENTS

| 6,353,321 | B1 * | 3/2002 | Bittar | G01V 3/30 324/338 |
| 6,714,153 | B1 * | 3/2004 | Kong | G01V 3/30 324/323 |

* cited by examiner

*Primary Examiner* — Melissa Koval
*Assistant Examiner* — Trung Nguyen
(74) *Attorney, Agent, or Firm* — Vidas Arrett & Steinkraus

(57) ABSTRACT

A borehole while-drilling electromagnetic tomography advanced detection apparatus includes a site host, a drilling rig, a detecting pipe screwed coupling on one end to a drilling stem of the drilling rig, a drilling bit screwed coupling to the other end of the detecting pipe, wherein the detecting pipe is provided with a probe comprising a transmitting coil, a receiving coil, an electromagnetic transmitting module, an electromagnetic receiving module, a SCM (Single Chip Microcomputer), a 3D electronic compass, a network interface of the probe and a first memory, in which the memory port of the SCM is connected to the first memory, and the network interface of the probe can be data-communicated with the site host.

3 Claims, 2 Drawing Sheets

BOREHOLE WHILE DRILLING ELECTROMAGNETIC TOMOGRAPHY ADVANCED DETECTION APPARATUS AND METHOD

FIELD OF THE INVENTION

The present invention relates to the field of drilling technology, in particular to an advanced detection apparatus and method by using borehole while drilling electromagnetic tomography technology.

BACKGROUND

The advanced detection primarily means to detect the presence or absence of harmful geological formations or water-rich bodies and water-conducting channels in the head direction of tunnel, roadway and working face driving by direct or indirect way, so as to provide detailed detection information for security of tunnel driving.

The direct method currently used for coal mine advanced detection is drilling method and the indirect method is geophysical prospecting method. Although the drilling method can obtain quite reliable drilling results, the longer construction period and higher costs will affect the normal production of the tunnel and roadway.

The geophysical prospecting methods available for advanced detection now are three-pole method, mine transient electromagnetic method, seismic wave method, borehole electrical method and borehole electromagnetic method after drilling.

These geophysical prospecting methods are carried out in the tunnel, roadway, working face or borehole after drilling. However, for those prior art methods, there are obvious interference of roadway and working face, for example, the detecting results of three-pole method and mine transient electromagnetic method can be affected seriously by the metal apparatus in the roadway and tunnel such as boring machine, rail track, I-beam support, bolts support, transport belt brackets. In addition, the construction design on the site, data observations and the results of the analysis are complex, and it is difficult for overcome the problem of multiple solutions due to using single detecting parameter—resistivity. If using a combination of above-mentioned methods, the costs for advanced forecast will be greatly increased. Furthermore, a disadvantage of those borehole detecting methods after drilled is that the detection of borehole usually cannot be achieved because the borehole often collapses after drilling due to relatively soft coal seam. The seismic method is mainly to solve the problem of geological tectonic interface and cannot explain the rich-water configuration.

REFERENCES

"The Principles of Electromagnetic Sounding", Piao et.al, Geological Publishing House, 1990; "The Principles of Time-Domain Electromagnetic Method", Niu et.al, Central South University Press, 2007.

SUMMARY OF THE INVENTION

The object of the present invention is to provide an advanced detection apparatus and method by borehole while-drilling electromagnetic tomography, by which the borehole being drilled in the head direction of tunnel, roadway and working face driving can be detected, and the harmful geological formations such as water-rich bodies and water-conducting channels within the range of 0~50 m around the borehole can be detected, and an accuracy and effective predetection can be achieved.

To achieve this object, the present invention is to provide a borehole while-drilling electromagnetic tomography advanced detection apparatus, comprising a site host, a drilling rig, a detecting pipe screwed coupling on one end to a drilling stem of the drilling rig, a drilling bit screwed coupling to the other end of the detecting pipe, wherein the detecting pipe is provided with a probe comprising a transmitting coil, a receiving coil, an electromagnetic transmitting module, an electromagnetic receiving module, a SCM (Single Chip Microcomputer), a 3D electronic compass, a network interface of the probe and a first memory, in which the memory port of the SCM is connected to the first memory, the communication port of the SCM is connected to the network interface of the probe, the compass communication port of the SCM is connected to the communication port of the 3D electronic compass, the electromagnetic transmission control signal output of the SCM is connected to the input of the electromagnetic transmitting module, the electromagnetic receiving port of the SCM is connected to the output of the electromagnetic receiving module, the output of the electromagnetic transmitting module is connected to the transmitting coil, the input of the electromagnetic receiving module is connected to the receiving coil, and the network interface of the probe can be data-communicated with the site host.

The present invention is to provide an advanced detection method by using the borehole while-drilling electromagnetic tomography advanced detection apparatus, wherein the method comprises the following steps:

Step 1: The drilling rig is provided in the roadway to drill in surrounding rock with the drilling stem of the drilling rig, the detecting pipe and the drilling bit;

Step 2: The drilling rig is stopped when drilling at the end of the drilling stem, at this time the drilling depth is equal to the overall length of the detecting pipe, the drilling bit and the drilling stem and the detecting pipe is changed from rotating into stationary state;

Step 3: When the detecting pipe is changed from rotating into a stationary state, the 3D electronic compass transmits a signal of the detecting pipe in a stationary state to the SCM, and the SCM transmits two sets of detecting electromagnetic waves having different frequencies via the electromagnetic transmitting module and the transmitting coil in turn, and then two sets of responding electromagnetic waves having different frequencies are formed in the borehole while drilling in response to the two sets of detecting electromagnetic waves having different frequencies and received by the receiving coil, the responding electromagnetic waves and the data of corresponding frequencies thereof are transmitted to the SCM to be digitally processed; wherein the SCM reads 3D track data and the detection time of the detecting pipe via the 3D electronic compass and all the data is restored in the first memory of the SCM;

Step 4: The drilling stem, detecting pipe and drilling bit are removed from the borehole and the drilling depth is recorded by the site host based on the length of the drilling stem, detecting pipe and drilling bit, and then the site host reads the data of the two sets of responding electromagnetic waves having different frequencies, the corresponding electromagnetic frequencies and the 3D track data and the detection time of the detecting pipe from the first memory via the network interface of the detecting pipe;

Step 5: Another drilling stem is installed at the end of the drilling stem and the second drilling operation is performed again in the borehole and stopped when the drilling rig reaches the end of the drilling stem, at this time the drilling depth is equal to the overall length of the detecting pipe, the drilling bit and two drilling stems and the detecting pipe is changed from rotating into a stationary state, and then the steps 3 and 4 are repeated so that the site host can obtain the data of the two sets of responding electromagnetic waves having different frequencies, the corresponding electromagnetic frequencies and the 3D track data and the detection time of the detecting pipe during the second drilling operation;

Step 6: According to the prior method disclosed in the reference "The Principle of Electromagnetic Sounding", the site host calculates an apparent resistivity value in response to the responding electromagnetic wave having each frequency and the detecting radius of corresponding frequency from the data of the two sets of responding electromagnetic waves having different frequencies and the corresponding electromagnetic frequencies;

According to the prior method disclosed in the reference "The Principle of Electromagnetic Sounding", the site host calculates with the data of the various responding electromagnetic waves having different frequencies, the apparent resistivity value in response to the responding electromagnetic wave having each frequency and the detecting radius of corresponding frequency to generate an apparent resistivity spectrum of the surrounding rock in the borehole and calculates with the 3D track data of the detecting pipe to generate a track map of the borehole;

Step 7: According to the apparent resistivity spectrum of the surrounding rock in the borehole and the track map of the borehole obtained from Step 6 to calculate the 3 times standard derivation value and the average value of the apparent resistivity at all measuring points of the borehole, if the difference between the average value and the apparent resistivity value at each measuring point of the borehole is more than the 3 times standard derivation value, then there is a abnormal low-resistivity body within the range of 0.5~50 m distance from the measuring point and whether the low-resistivity body is a water-rich body or not can be analyzed based on the results of abnormal low-resistivity and geological data surrounding the borehole by the prior method disclosed in the reference "The Principle of Electromagnetic Sounding", so that the advanced detection of borehole while drilling can be achieved.

The beneficial effects of the present invention comparing to the prior art are mainly in that:

1) According to the present invention, the probe is mounted in the borehole being drilled between the drilling stem and bit of the rig and screwed connecting to them, and the probe can transmit a set of electromagnetic waves having different frequencies to detect geological characteristics of rock surrounding the borehole within different radius distance, to judge the presence or absence of harmful geological bodies such as water-rich bodies within a certain range around the borehole. With the borehole drilling, the probe will automatically detect at different depth to obtain the geological characteristics within a cylinder surrounding the whole borehole, so as to achieve a larger detection range, more information, and accurate and reliable since the detected results at adjacent measuring points can be verified with each other. Further, the present invention can greatly reduce the number of the detecting pipes to save time and costs, improve work efficiency, and improve the ability to exclude the potential flooding in tunnel driving of coal mine.

2) According to the present invention, a set of different frequencies of electromagnetic waves are transmitted to obtain a large amount of data, and the underground artificial strong interference background (since simple wall rock surrounding the borehole, absence of drilling machine, rail track, I-beam support, bolts support, transport belt brackets and other metal facilities) can be avoided to achieve a relatively fixed background, so that the ability to identify and process weak signals can be improved to ensure that the results are accurate and reliable as a guide to provide a more scientific basis for roadway excavation.

3) According to the present invention, the detection results can be displayed real-time by the site host when detection, automatically analyzed into a diagram for forecasting without complicated manual data analysis and processing stages, so that a reliable forecast data can be provided for the geological detecting staff. Thus, the apparatus of the present invention has the advantages of operability, effectiveness and practicality.

4) Compared with the borehole detection after drilling discussed in the Background, the situation of unable to detect due to collapse of borehole in the prior art cannot happened in the present invention, which has advantages of drilling detection without blind spots and dead angle.

The present invention achieves the advanced detection while drilling by roadway advanced drilling, a close-range and fine scanning detection can be achieved within a radius of 0.5~50 m around the borehole. It is a combination of drilling and geophysical exploration, so that it cannot only improve the detection accuracy of geophysical prospecting, but also reduce the number of drilling boreholes to achieve the advanced and accurate detection of roadway in driving.

1—site host, 1.1—CPU, 1.2—second memory, 1.3—interface device, 1.4—host network interface, 1.5—system bus, 2—probe, 2.1—transmitting coil, 2.2—receiving coil, 2.3—electromagnetic transmitting module, 2.4—electromagnetic receiving module, 2.5—SCM, 2.6—3D electronic compass, 2.7—probe network interface, 2.8—first memory, 3—drilling rig, 4—drilling stem, 5—borehole while drilling, 6—detecting pipe, 6.1—transmitting coil base, 6.2—receiving coil base, 6.3—probe circuit cavity, 7—drilling bit, 8—roadway, 9—surrounding rock.

DESCRIPTION OF THE PREFERRED EMBODIMENTS

The invention will be further described in detail in combination with the accompanying drawings.

Figure 1:
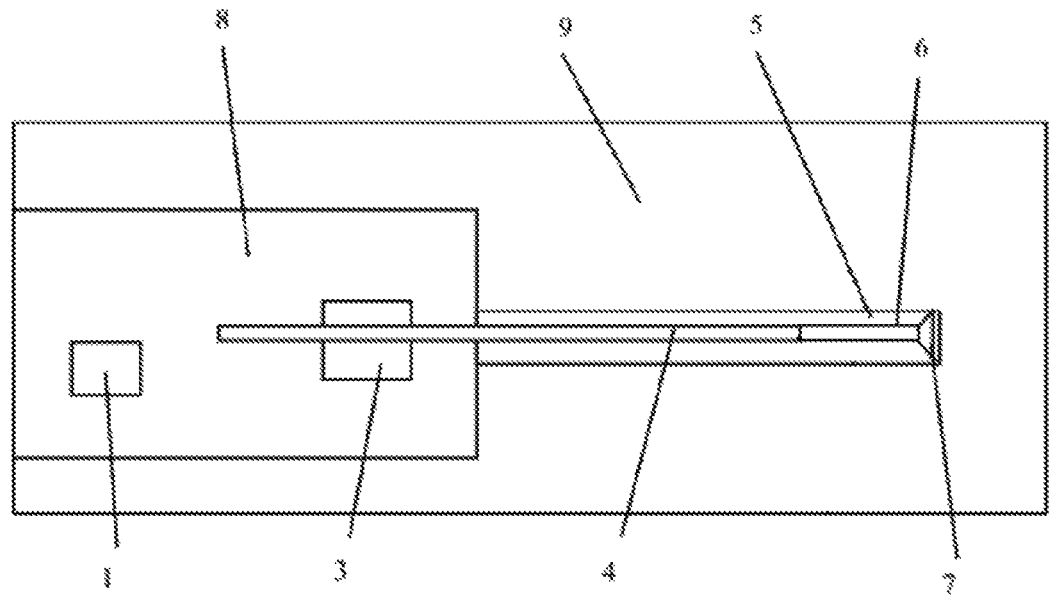
FIG. 1 is a schematic diagram of the apparatus of the present invention in use.
Figure 2:
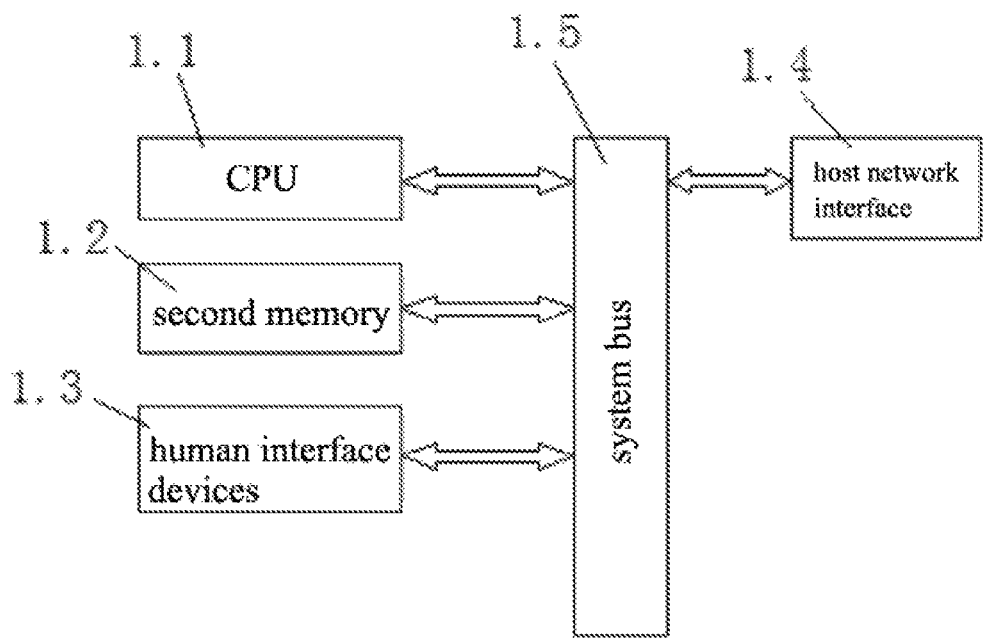
FIG. 2 is a block diagram of the site host of the present invention.
Figure 3:
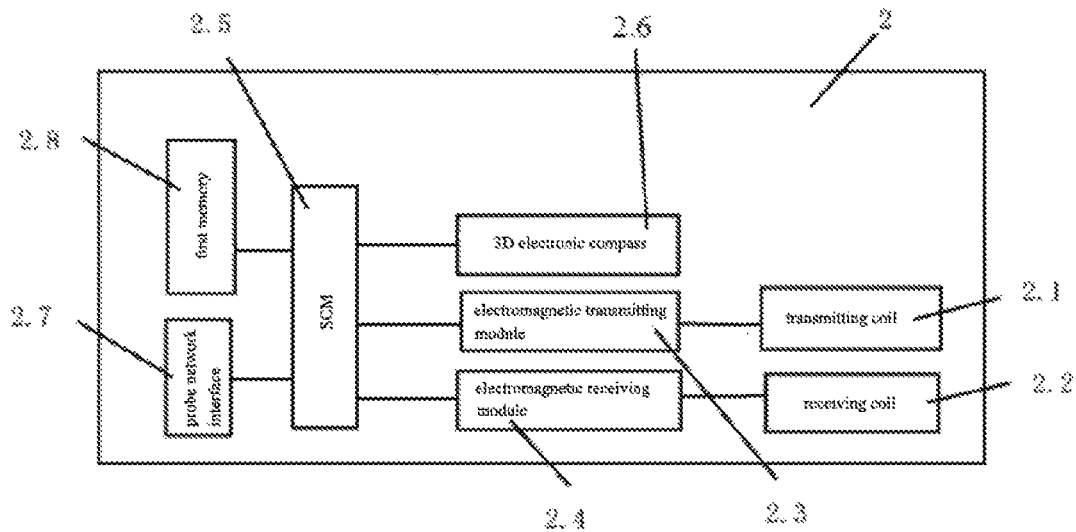
FIG. 3 is a block diagram of the probe of the present invention.
Figure 4:
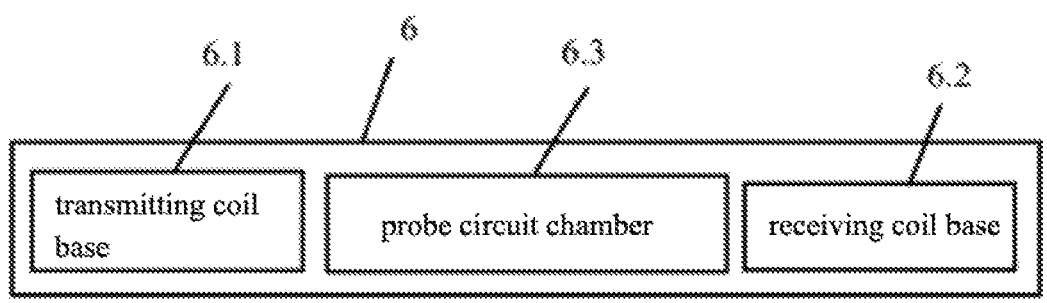
FIG. 4 is a block diagram of the detecting pipe of the present invention.

A borehole while-drilling electromagnetic tomography advanced detection apparatus as shown in FIGS. 1-4 comprises a site host 1, a drilling rig 3, a detecting pipe 6 screwed coupling on one end to a drilling stem 4 of the drilling rig 3, a drilling bit 7 screwed coupling to the other end of the detecting pipe 6, wherein the detecting pipe 6 is provided with a probe 2 comprising a transmitting coil 2.1, a receiving coil 2.2, an electromagnetic transmitting module 2.3, an electromagnetic receiving module 2.4, a SCM (Single Chip Microcomputer) 2.5, a 3D electronic compass

2.6, a network interface of the probe 2.7 and a first memory 2.8, in which the memory port of the SCM 2.5 is connected to the first memory 2.8, the communication port of the SCM 2.5 is connected to the network interface of the probe 2.7, the compass communication port of the SCM 2.5 is connected to the communication port of the 3D electronic compass 2.6, the electromagnetic transmission control signal output of the SCM 2.5 is connected to the input of the electromagnetic transmitting module 2.3, the electromagnetic receiving port of the SCM 2.5 is connected to the output of the electromagnetic receiving module 2.4, the output of the electromagnetic transmitting module 2.3 is connected to the transmitting coil 2.1, the input of the electromagnetic receiving module 2.4 is connected to the receiving coil 2.2, and the network interface of the probe 2.7 can be data-communicated with the site host 1.

In an embodiment, the site host 1 comprises a CPU 1.1, second memory 1.2, human interface device 1.3, network interface of the host 1.4 and a system bus 1.5, wherein the CPU 1.1 is connected to the second memory 1.2, the human interface device 1.3 and the network interface of the host 1.4 via the system bus 1.5 and the network interface of the host 1.4 can be data-communicated with the network interface of the probe 2.7.

In an embodiment, the detecting pipe 6 is provided with a transmitting coil base 6.1, a receiving coil base 6.2, and a probe circuit chamber 6.3, wherein the transmitting coil 2.1 is wound on the transmitting coil base 6.1, the receiving coil 2.2 is wound on the receiving coil base 6.2, and the electromagnetic transmitting module 2.3, the electromagnetic receiving module 2.4, the SCM 2.5, the 3D electronic compass 2.6, the network interface of the probe 2.7 and the first memory 2.8 are mounted inside the probe circuit chamber 6.3.

In an embodiment, the electromagnetic transmitting module 2.3 and the transmitting coil 2.1 can transmit electromagnetic waves having different frequencies to the surrounding of the borehole while drilling 5 under control of the SCM 2.5, and the electromagnetic receiving module 2.4 and the receiving coil 2.2 are used for receiving the responding electromagnetic signals in response to the transmitting electromagnetic waves around the borehole being drilled, wherein the responding electromagnetic signals have a plurality of different frequencies in correspond to the transmitting electromagnetic waves.

The responding electromagnetic signals can be digitally processed by the SCM 2.5 and the digital-processed electromagnetic signals are restored in the first memory 2.8 of the SCM 2.5. After to be increasing the length of the drill pipe and drill rig And probe drill exit after drilling through the probe network port (or ports of 8-peer communication) will transport all the data to the host site 1, the host site for obtaining an apparent resistivity probe radius detection values of the respective frequency response of the electromagnetic wave and the corresponding frequency response depending on the frequency of the electromagnetic signal and the corresponding digital frequency calculation, and to detect all the different electrical frequencies Wave and the probe radius and electromagnetic frequencies corresponding to each probe apparent resistivity values and corresponding frequency to generate different radii of rock surrounding a borehole apparent resistivity profiles.

In an embodiment, the detecting pipe 6 is made by beryllium copper or non-magnetic material and the outer layer of the transmitting coil 2.1 and the receiving coil 2.2 are encapsulated with a wear-resistant non-metallic material.

The length of the transmitting coil 2.1 is equal to the length of the receiving coil 2.2, and each length is in the range of 100~200 m.

An advanced detection method by using the borehole while-drilling electromagnetic tomography advanced detection apparatus comprises the following steps:

Step 1: The drilling rig 3 is provided in the roadway 8 to drill in surrounding rock 9 with the drilling stem 4 of the drilling rig 3, the detecting pipe 6 and the drilling bit 7;

Step 2: The drilling rig 3 is stopped when drilling at the end of the drilling stem 4, at this time the drilling depth is equal to the overall length of the detecting pipe 6, the drilling bit 7 and the drilling stem 4, and the detecting pipe 6 is changed from rotating into stationary state;

Step 3: When the detecting pipe 6 is changed from rotating into a stationary state, the 3D electronic compass 2.6 transmits a signal of the detecting pipe 6 in a stationary state to the SCM 2.5, and the SCM 2.5 transmits two sets of detecting electromagnetic waves having different frequencies via the electromagnetic transmitting module 2.3 and the transmitting coil 2.1 in turn, and then two sets of responding electromagnetic waves having different frequencies are formed in the borehole while drilling in response to the two sets of detecting electromagnetic waves having different frequencies and received by the receiving coil 2.2, the responding electromagnetic waves and the data of corresponding frequencies thereof are transmitted to the electromagnetic receiving module 2.4 to be digitally processed; wherein the SCM 2.5 reads 3D track data and the detection time of the detecting pipe 6 via the 3D electronic compass 2.6 and all the data is restored in the first memory 2.8 of the SCM 2.5;

Step 4: The drilling stem 4 of the drilling rig 3, detecting pipe 6 and drilling bit 7 are removed from the borehole 5 and the drilling depth is recorded by the site host 1 based on the length of the drilling stem 4, detecting pipe 6 and drilling bit 7, after disconnecting the detecting pipe 6 from the drilling stem 4, the site host 1 reads the data of the two sets of responding electromagnetic waves having different frequencies, the corresponding electromagnetic frequencies and the 3D track data and the detection time of the detecting pipe from the first memory 2.8 via the network interface 2.7 of the detecting pipe 6;

Step 5: Another drilling stem 4 is installed at the end of the drilling stem 4 and the second drilling operation is performed again in the borehole 5 and stopped when the drilling rig 3 reaches the end of the drilling stem 4, at this time the drilling depth is equal to the overall length of the detecting pipe 6, the drilling bit 7 and the both drilling stems 4, and the detecting pipe 6 is changed from rotating into a stationary state, and then the steps 3 and 4 are repeated so that the site host 1 can obtain the data of the two sets of responding electromagnetic waves having different frequencies, the corresponding electromagnetic frequencies and the 3D track data and the detection time of the detecting pipe during the second drilling operation;

Step 6: According to the prior method disclosed in the references "The Principles of Electromagnetic Sounding" and "The Principles of Time-Domain Electromagnetic Method", the site host 1 calculates an apparent resistivity value in response to the responding electromagnetic wave having each frequency and the detecting radius of corresponding frequency from the data of the two sets of responding electromagnetic waves having different frequencies and the corresponding electromagnetic frequencies;

According to the prior method disclosed in the reference "The Principle of Electromagnetic Sounding" and "The Principles of Time-Domain Electromagnetic Method", the site host 1 calculates with the data of the various responding electromagnetic waves having different frequencies, the apparent resistivity value in response to the responding electromagnetic wave having each frequency and the detecting radius of corresponding frequency to generate an apparent resistivity spectrum of the surrounding rock 9 in the borehole 5 and calculates with the 3D track data of the detecting pipe 6 to generate a track map of the borehole 5;

Step 7: According to the apparent resistivity spectrum of the surrounding rock in the borehole 5 and the track map of the borehole 5 obtained from Step 6 to calculate the 3 times standard derivation value and the average value of the apparent resistivity at all measuring points of the borehole, if the difference between the average value and the apparent resistivity value at each measuring point of the borehole is more than the 3 times standard derivation value, then there is an abnormal low-resistivity body within the range of 0.5~50 m distance from the measuring point and whether the low-resistivity body is a water-rich body or not can be analyzed based on the results of abnormal low-resistivity and geological data surrounding the borehole by the prior method disclosed in the reference "The Principle of Electromagnetic Sounding" and "The Principles of Time-Domain Electromagnetic Method", so that the advanced detection of borehole while drilling can be achieved.

In an embodiment, there is a step 5.1 between the step 5 and 6, comprising after the second drilling operation is finished and the corresponding data is obtained, the data corresponding to the $N^{th}$ drilling operation is obtained in accordance with the step 5 and the borehole while drilling 5 reaches the target depth after the $N^{th}$ drilling operation;

Step 6: From the data of the two sets of responding electromagnetic waves having different frequencies and the corresponding electromagnetic frequencies during the $N^{th}$ drilling operation, the site host 1 calculates an apparent resistivity value in response to the responding electromagnetic wave having each frequency and the detecting radius of corresponding frequency;

In an embodiment, during the detecting pipe 6 drills down step by step from the aperture of the borehole 5 to the target drilling depth, the advanced detection is carried out by using the length of the drilling stem 4 as a pitch.

In an embodiment, each of the drilling stems 4 has the same length of 1~3 m.

In an embodiment, the frequency of the detecting electromagnetic wave ranges from 50 kHz~1 kHz, and the frequency of the responding electromagnetic wave ranges from 50 kHz~1 kHz.

As examples, when the detecting electromagnetic wave having a frequency of 50 kHz is transmitted, the apparent resistivity calculated from the received responding electromagnetic signals is 500 ohm/m and the detecting radius is 0.5 m; when the detecting electromagnetic wave having a frequency of 40 kHz is transmitted, the apparent resistivity calculated from the received responding electromagnetic signals is 550 ohm/m and the detecting radius is 2.0 m; when the detecting electromagnetic wave having a frequency of 30 kHz is transmitted, the apparent resistivity calculated from the received responding electromagnetic signals is 530 ohm/m and the detecting radius is 6.5 m; when the detecting electromagnetic wave having a frequency of 20 kHz is transmitted, the apparent resistivity calculated from the received responding electromagnetic signals is 510 ohm/m and the detecting radius is 10.5 m; when the detecting electromagnetic wave having a frequency of 10 kHz is transmitted, the apparent resistivity calculated from the received responding electromagnetic signals is 500 ohm/m and the detecting radius is 20.1 m; when the detecting electromagnetic wave having a frequency of 5 kHz is transmitted, the apparent resistivity calculated from the received responding electromagnetic signals is 200 ohm/m and the detecting radius is 30.0 m; when the detecting electromagnetic wave having a frequency of 2.5 kHz is transmitted, the apparent resistivity calculated from the received responding electromagnetic signals is 150 ohm/m and the detecting radius is 35.5 m; when the detecting electromagnetic wave having a frequency of 1 kHz is transmitted, the apparent resistivity calculated from the received responding electromagnetic signals is 600 ohm/m and the detecting radius is 48.5 m. When the electromagnetic waves having 8 different frequencies are transmitted to detect, the apparent resistivity spectrum at different radius of borehole is generated from the received responding electromagnetic signals, which indicates that there is a low-resistivity area in the range of 0.5~50 m around the borehole and then the presence or absence of a water-rich body will be deduced in accordance with geological data. The detecting radius is based on the borehole while drilling 5 as the centre of a circle.

The technical contents without a detailed description in the specification should be well-known for those skilled in the art. It will be appreciated by those skilled in the art that variations and modifications are possible within the scope of the appended claims.

What is claimed:

1. A borehole while-drilling electromagnetic tomography advanced detection apparatus, comprising a site host, a drilling rig, a detecting pipe screwed coupling on one end to a drilling stem of the drilling rig, a drilling bit screwed coupling to the other end of the detecting pipe, wherein the detecting pipe is provided with a probe comprising a transmitting coil, a receiving coil, an electromagnetic transmitting module, an electromagnetic receiving module, a SCM, a 3D electronic compass, a probe network interface and a first memory, in which the memory port of the SCM is connected to the first memory, the communication port of the SCM is connected to the probe network interface, the compass communication port of the SCM is connected to the communication port of the 3D electronic compass, the electromagnetic transmission control signal output of the SCM is connected to the input of the electromagnetic transmitting module, the electromagnetic receiving port of the SCM is connected to the output of the electromagnetic receiving module, the output of the electromagnetic transmitting module is connected to the transmitting coil, the input of the electromagnetic receiving module is connected to the receiving coil, and the probe network interface is data-communicated with the site host; wherein the site host comprises a CPU, a second memory, a human interface device, a host network interface and a system bus, wherein the CPU is connected to the second memory, the human interface device and the host network interface via the system bus, and the host network interface is data-communicated with the probe network interface; wherein the detecting pipe is provided with a transmitting coil base, a receiving coil base and a probe circuit chamber, wherein the transmitting coil is wound on the transmitting coil base, the receiving coil is wound on the receiving coil base, and the electromagnetic transmitting module, the electromagnetic receiving module, the SCM, the 3D electronic compass, the probe network interface and the first memory are mounted into the probe circuit chamber.

2. The borehole while-drilling electromagnetic tomography advanced detection apparatus according to claim 1, wherein the detecting pipe is made by beryllium copper or non-magnetic material, and the outer layer of the transmitting coil and the receiving coil are encapsulated with a wear-resistant non-metallic material.

3. The borehole while-drilling electromagnetic tomography advanced detection apparatus according to claim 1, wherein each of the drilling stems has the same length of 1~3 m.

* * * * *